US006984674B2

(12) United States Patent
Gray et al.

(10) Patent No.: US 6,984,674 B2
(45) Date of Patent: Jan. 10, 2006

(54) CURABLE, WELDABLE COATING COMPOSITIONS

(75) Inventors: Ralph C. Gray, Butler, PA (US); Ellor James Van Buskirk, Wexford, PA (US); Michael J. Pawlik, Glenshaw, PA (US); Richard M. Nugent, Jr., Allison Park, PA (US); Dennis W. Jones, Glenshaw, PA (US); Kathleen M. Coldren, Leechburg, PA (US); Steven D. Perrine, Allison Park, PA (US); James E. Jones, Butler, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/803,391

(22) Filed: Mar. 18, 2004

(65) Prior Publication Data

US 2004/0176515 A1 Sep. 9, 2004

Related U.S. Application Data

(62) Division of application No. 09/858,280, filed on May 16, 2001, now Pat. No. 6,750,274.
(60) Provisional application No. 60/267,521, filed on Feb. 8, 2001.

(51) Int. Cl.
| | | |
|---|---|---|
| C08K 3/20 | (2006.01) | |
| C08L 33/14 | (2006.01) | |
| C08L 61/28 | (2006.01) | |
| C08L 63/02 | (2006.01) | |
| C08L 75/04 | (2006.01) | |

(52) U.S. Cl. .................. 523/416; 523/409; 523/412; 523/414; 523/415; 523/417

(58) Field of Classification Search ............. 523/416, 523/458, 459, 468, 409, 412, 414, 415, 417; 525/124, 127, 151, 182, 208, 327.2, 423, 525/502, 503, 504, 506, 510, 523
See application file for complete search history.

(56) References Cited

U.S. PATENT DOCUMENTS

| | | | |
|---|---|---|---|
| 2,541,027 A | 2/1951 | Bradley | 148/6.15 |
| 3,874,921 A | 4/1975 | Todd | 117/227 |
| 4,046,729 A | 9/1977 | Scriven et al. | 260/29.2 TN |
| 4,059,550 A | 11/1977 | Shimp | 260/29.4 R |
| 4,086,096 A | 4/1978 | McLeod | 106/1.17 |
| 4,157,924 A | 6/1979 | Elms et al. | 428/413 |
| 4,162,244 A | 7/1979 | Bertram | 523/459 |
| 4,186,036 A | 1/1980 | Elms et al. | 148/6.15 R |
| 4,289,812 A | 9/1981 | Martin | 427/379 |
| 4,326,922 A | 4/1982 | Ferrari et al. | 376/435 |
| 4,346,143 A | 8/1982 | Young, Jr. et al. | 428/332 |
| 4,352,899 A | 10/1982 | Tada et al. | 523/451 |
| 4,461,857 A | 7/1984 | Sekmakas et al. | 523/414 |
| 4,605,476 A | 8/1986 | Hart et al. | 204/181.6 |
| 5,001,173 A | 3/1991 | Anderson et al. | 523/406 |
| 5,084,541 A | 1/1992 | Jacobs, III et al. | 528/45 |
| 5,091,451 A | 2/1992 | Kahle et al. | 524/124 |
| 5,294,265 A | 3/1994 | Gray et al. | 148/250 |
| 5,306,526 A | 4/1994 | Gray et al. | 427/309 |
| 5,641,818 A | 6/1997 | Sweet | 523/404 |
| 5,653,823 A | 8/1997 | McMillen et al. | 148/247 |
| 5,693,703 A | 12/1997 | Hart | 524/502 |
| 5,853,890 A | 12/1998 | Odawa et al. | 428/412 |
| 5,858,282 A | 1/1999 | Seiner et al. | 252/389.1 |
| 6,005,045 A | 12/1999 | Klanica | 524/507 |
| 6,008,462 A | 12/1999 | Soltwedel | 219/91.2 |
| 6,440,580 B1 | 8/2002 | Berger et al. | 428/623 |
| 6,641,923 B2 * | 11/2003 | Sadvary et al. | 428/447 |

FOREIGN PATENT DOCUMENTS

| | | |
|---|---|---|
| JP | 59-116397 A | 7/1984 |
| JP | 60-203677 A | 10/1985 |
| JP | 7-331164 A | 12/1995 |
| WO | WO 00/32351 A | 6/2000 |

* cited by examiner

Primary Examiner—Robert Sellers
(74) Attorney, Agent, or Firm—Deborah M. Altman

(57) ABSTRACT

A curable coating composition is disclosed comprising a resinous binder comprising (a) a reaction product of an epoxy-containing polymer with a compound containing phosphorus acid groups, the reaction product having reactive functional groups, and (b) a curing agent having functional groups reactive with the functional groups of (a). An electroconductive pigment is dispersed in (a) such that the weight ratio of the electroconductive pigment to (a) plus (b) is within the range of 0.5 to 9.0:1. When the curable coating composition is deposited and cured on a metal substrate, the cured coating is weldable.

5 Claims, No Drawings

US 6,984,674 B2

CURABLE, WELDABLE COATING COMPOSITIONS

This application is a division of application Ser. No. 09/858,280, filed May 16, 2001, now U.S. Pat. No. 6,750,274 which claims the benefit of U.S. Provisional Application No. 60/267,521, filed Feb. 8, 2001.

FIELD OF THE INVENTION

This invention relates generally to curable, weldable coatings for metal substrates, and more particularly, to curable, weldable coatings for metal substrates, which inhibit corrosion.

BACKGROUND OF THE INVENTION

The production of light gauge steel for end uses ranging from architectural construction materials to automobiles is well known. A rolling mill line produces continuous sheets of steel in the required thickness and width. The steel sheets may be coated with a thin layer of zinc metal via a galvanizing process. Eventually, mill oil is applied to the uncoated or galvanized steel sheets, and the steel is either stored or shipped in a coil to a customer for further processing.

Typically, the customer is an automobile manufacturer who will take the coiled metal sheet and pass it through a lubricating station and then to a forming operation where the metal sheet is cut and formed into a part such as a roof, fender, door, etc. The parts are then welded together to form an automobile body. Next, the automobile body is cleaned, treated with a zinc phosphating solution to enhance corrosion protection, and rinsed with deionized water. The treated automobile body is then passed through an electrodeposition bath where a corrosion resistant primer is applied.

The automobile manufacturers would like to streamline their operations and have some of the operations described above done outside the automobile assembly plant, for example at a steel mill or a custom coater. One major problem with moving certain operations to a steel mill or a custom coater is that any coating applied outside the automobile assembly plant must be able to accept a weld. At some point in time, the various metal parts will be welded together in the automobile assembly plant to form the automobile body. Consequently, automobile manufacturers have a strong demand for a weldable, corrosion resistant coating composition that can be applied at a steel mill or at a custom coating facility.

Such a weldable, corrosion resistant coating composition could be applied at a custom coater, known as a coil coater, who would ship the coated metal sheet to the automobile manufacturer. As described above, the automobile manufacturer would then form the metal sheet into parts and weld the parts together. However, the metal pretreatment operation and perhaps the electrodeposition process could be avoided since the metal received by the automobile manufacturer would already contain a corrosion resistant coating.

Similar to the above, a weldable, corrosion resistant coating composition could also be applied at a steel mill. Application at the steel mill enables the automobile manufacturer to receive corrosion resistant metal directly without the expense associated with shipping the metal to a coil coater and from the coil coater to the automobile manufacturer.

The present invention provides a weldable, curable coating composition that provides corrosion protection and can be applied by a coil coater or at a steel mill, can be cured at low temperature and provides good adhesion and good corrosion protection without prior metal pretreatment.

SUMMARY OF THE INVENTION

One aspect of the present invention is a curable coating composition comprising:
a. a resinous binder comprising:
   i. a reaction product of an epoxy-containing polymer with a compound containing phosphorus acid groups, the reaction product having reactive functional groups,
   ii. a curing agent having functional groups reactive with the functional groups of (i);
b. an electroconductive pigment dispersed in (a) such that the weight ratio of b to (i) plus (ii) is within the range of 0.5 to 9.0:1,
the curable coating composition being characterized such that when it is deposited and cured on a metal substrate, the cured coating is weldable.

Another aspect of the present invention is an aqueous-based coating composition comprising:
a. a resinous binder comprising:
   i. a reaction product of an epoxy-containing polymer with a compound containing phosphorus acid groups, the reaction product having reactive functional groups,
   ii. a curing agent having functional groups reactive with the functional groups of (i);
b. an electroconductive pigment dispersed in (a) such that the weight ratio of b to (i) plus (ii) is within the range of 0.5 to 9.0:1; and:
c. water,
the coating composition being characterized such that when it is deposited and cured on a metal substrate, the cured coating is weldable.

Yet, another aspect of the present invention is an organic solvent-based coating composition comprising:
a. a resinous binder comprising:
   i. a reaction product of an epoxy-containing polymer with a compound containing phosphorus acid groups, the reaction product having reactive functional groups,
   ii. a curing agent having functional groups reactive with the functional groups of (i);
b. an electroconductive pigment dispersed in (a) such that the weight ratio of b to (i) plus (ii) is within the range of 0.5 to 9.0:1; and
c. an organic solvent,
the curable coating composition being characterized such that when it is deposited cured on a metal substrate, the cured coating is weldable.

Another aspect of the present invention is a process for coating a continuous strip or coil of metal comprising:
a. applying directly to the metal sheet shortly after it is formed and at a temperature of 20 to 150° C., a curable coating composition comprising:
   i. a resinous binder comprising
      (A) a reaction product of an epoxy-containing polymer with a compound containing phosphorus acid groups, the reaction product having reactive functional groups,
      (B) a curing agent having functional groups reactive with the functional groups of (A);
   ii. an electroconductive pigment dispersed in (i) such that the weight ratio of (ii) to (A) plus (B) is within the range of 0.5 to 9.0:1, the curable coating composition being characterized such that when it is deposited and cured on a metal substrate, the cured coating is weldable; and b. drying the coating composition on the metal sheet.

Yet, another aspect of the invention is a process for coating a continuous metal coil comprising:

a. unwinding the metal sheet from a metal coil and passing the metal sheet in a substantially continuous manner through a cleaning station, a coating station, and a curing station;

b. applying to the metal sheet at the coating station a curable coating composition comprising:
  i. a resinous binder comprising:
    (A) a reaction product of an epoxy-containing polymer with a phosphorus-containing acid, the reaction product having reactive functional groups,
    (B) a curing agent having functional groups reactive with the functional groups of (A);
  ii. an electroconductive pigment dispersed in (i) such that the weight ratio of (ii) to (A) plus (B) is within the range of 0.5 to 9.0:1; and c. curing the coating composition applied to the metal sheet in step (b) as the coated metal sheet passes through the curing station.

DETAILED DESCRIPTION OF THE EMBODIMENTS

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, the disclosure of these ranges is intended as a continuous range including every value between the minimum and maximum values.

The present invention is a curable coating composition for metal substrates that can be applied without pretreatment and methods involving the same. The curable coating composition comprises a resinous binder. The resinous binder comprises a reaction product of an epoxy-containing polymer with a compound containing phosphorus acid groups. The reaction product has reactive functional groups.

Useful epoxy-containing polymers have at least one epoxy or oxirane group in the molecule, such as polyglycidyl ethers of polyhydric alcohols. Useful polyglycidyl ethers of polyhydric alcohols can be formed by reacting epihalohydrins like epibromohydrin, dichlorohydrin and epichlorohydrin with polyhydric alcohols, such as dihydric alcohols, in the presence of an alkali condensation and dehydrohalogenation catalyst. Suitable alkali condensation and dehydrohalogenation catalyst include sodium hydroxide or potassium hydroxide.

Suitable polyhydric alcohols can be aromatic, aliphatic or cycloaliphatic. Non-limiting examples of suitable aromatic polyhydric alcohols include phenols that are preferably at least dihydric phenols. Other useful aromatic polyhydric alcohols include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris (p-hydroxy phenyl)-propane; novolac resins; bisphenol F; long-chain bisphenols; and 2,2-bis(4-hydroxyphenyl)propane, i.e., bisphenol A.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

Preferably, the epoxy-containing polymer has at least two epoxy groups per molecule and aromatic or cycloaliphatic functionality to improve adhesion to a metal substrate. It is also preferred that the epoxy-containing polymer be relatively more hydrophobic than hydrophilic in nature. Further, the epoxy-containing polymer should have a number average molecular weight of about 220 to 25,000. The molecular weight can be determined by multiplying the epoxy equivalent weight or epoxy equivalent by the epoxy functionality or number of epoxy groups.

Useful epoxy-containing polymers are disclosed in U.S. Pat. Nos. 5,294,265; 5,306,526 and 5,653,823, which are hereby incorporated by reference. Other useful epoxy-containing materials include epoxy-functional acrylic polymers, glycidyl esters of carboxylic acids and mixtures thereof. Examples of suitable commercially available epoxy-containing polymers are available from Shell Chemical Company under the trademarks EPON® 836, EPON® 828, EPON® 1002F and EPON® 1004F. EPON® 836 and EPON® 828 are epoxy functional polyglycidyl ethers of bisphenol A prepared from bisphenol A and epichlorohydrin. EPON® 828 has a number average molecular weight of about 400 and an epoxy equivalent weight of about 185—192. EPON® 836 has an epoxy equivalent weight of about 178–186.

The compound containing phosphorus acid groups that is reacted with the epoxy-containing polymer comprises phosphonic acids, phosphorous acid, phosphoric acids (preferred) including super- and poly-, and mixtures thereof.

Examples of suitable phosphonic acids include those having at least one group of the structure:

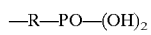

where R is —C—, preferably CH$_2$, and more preferably O—CO—(CH$_2$)$_2$—. Nonlimiting examples of suitable phosphonic acids include 1-hydroxyethylidene-1,1-diphosphonic acid, methylene phosphonic acids, and alpha-aminomethylene phosphonic acids containing at least one group of the structure:

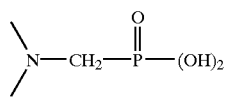

such as (2-hydroxyethyl)aminobis(methylene phosphonic) acid, isopropylaminobis(methylenephosphonic) acid and other aminomethylene phosphonic acids disclosed in U.S. Pat. No. 5,034,556 at column 2, line 52 to column 3, line 43, which is hereby incorporated by reference.

Other useful phosphonic acids include alpha-carboxymethylene phosphonic acids containing at least one group of the structure:

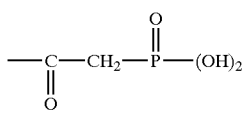

Nonlimiting examples of suitable phosphonic acids include benzylaminobis(methylene phosphonic) acid, cocoaminobis(methylene phosphonic) acid, triethylsilylpropylamino(methylene phosphonic) acid and carboxyethyl phosphonic acid.

The equivalent ratio of the compound containing phosphorus acid groups to epoxy-containing polymer is within the range of 0.3 to 5.0:1, preferably 0.5 to 3.5:1. The epoxy-containing polymer and the compound-containing phosphorus acid groups can be reacted together by any method known to those skilled in the art.

The functional groups associated with the reaction product of the epoxy-containing polymer and the compound-containing phosphorus acid groups are hydroxyl groups including acidic hydroxyls or hydroxyl groups and epoxy groups depending on the equivalent ratio of the compound containing phosphorus acid groups to epoxy-containing polymer.

The resinous binder of the present invention also comprises a curing agent having functional groups that are reactive with the functional groups of the reaction product described above. The curing agent can be selected from aminoplasts, polyisocyanates, including blocked isocyanates, polyacids, organometallic acid-functional materials, polyamines, polyamides and mixtures of any of the foregoing depending on the identity of the functional groups in the reaction product.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. For example, aldehyde condensates of glycoluril, which yield a high melting crystalline product useful in powder coatings, can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL® and from Solutia, Inc. under the trademark RESIMENE®. Preferred aminoplasts are CYMEL® 385 (preferred for water-based compositions), CYMEL® 1158 imino-functional melamine formaldehyde condensates,-and CYMEL® 303.

Other curing agents suitable for use include, but are not limited to, polyisocyanate curing agents. As-used herein, the term "polyisocyanate" is intended to include blocked (or capped) polyisocyanates as well as unblocked polyisocyanates. The polyisocyanate can be aliphatic, aromatic, or a mixture of the foregoing. Although higher polyisocyanates such as isocyanurates of diisocyanates are often used, diisocyanates can be used. Higher polyisocyanates also can be used in combination with diisocyanates. Isocyanate prepolymers, for example reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. Other useful curing agents comprise blocked polyisocyanate compounds such as, for example the tricarbamoyl triazine compounds described in detail in U.S. Pat. No. 5,084,541, which is incorporated herein by reference.

Suitable curing agents are described in U.S. Pat. No. 4,346,143 at column 5, lines 45–62 and include blocked or unblocked di- or polyisocyanates such as toluene diisocyanate blocked with caprolactam. A toluene diisocyanate blocked with caprolactam is commercially available from Bayer Corporation under the trademark DESMODUR® BL 1265.

Suitable polyacid curing agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Useful organometallic complexed materials which can be used as curing agents include a stabilized ammonium zirconium carbonate solution commercially available from Magnesium Elektron, Inc. under the trademark BACOTE™ 20, stabilized ammonium, zirconium carbonate, and a zinc-based polymer crosslinking agent commercially available from Ultra Additives Incorporated under the trademark ZINPLEX 15.

Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. These and other suitable polyamines are described in detail in U.S. Pat. No. 4,046,729 at column 6, line 61 to column 7, line 26, which is incorporated herein by reference.

Appropriate mixtures of curing agents may also be used in the invention. The weight percent of the curing agent generally ranges from 5 to 60 percent based on the total weight of the resinous binder.

The curable coating also comprises an electroconductive pigment dispersed in the resinous binder. Nonlimiting examples of suitable electroconductive pigments include zinc, aluminum, iron, graphite, iron phosphide, tungsten, stainless steel, and mixtures thereof. Suitable zinc pigments are commercially available from ZINCOLI GmbH under the trademark ZINCOLIS 620 or 520. Suitable iron phosphide pigments are commercially available from Occidental Chemical Corporation under the trademark FERROPHOS™.

The electroconductive pigment is dispersed in the resinous binder such that the curable coating composition deposited and cured on a metal substrate is weldable. The term "weldable" is defined as being sufficiently electroconductive to sustain a spot welding and joining operation as used in an automotive assembly plant. Preferably, the weight ratio of the electro-conductive pigment to the reaction product plus curing agent is within the range of 0.2 to 10. Also, the weight percent of electroconductive pigment based on the total weight of resinous binder plus electroconductive pigment is from 30 to 95 percent.

The curable coating composition may contain a diluent. Diluents are is added to adjust the viscosity of the coating composition. If a diluent is used, it should not detrimentally affect the adhesion of the curable coating composition to the metal substrate. Useful diluents include water, organic solvents, or mixtures of water and organic solvents.

When water is included as a diluent, dispersants, thickeners, stabilizers, rheology modifiers, and anti-settling agents are required. A suitable rheology-modifier is available from Rohm and Haas Company under the trademark Rheology Modifier QR-708, Experimental. A suitable stabilizing and dispersing agent is potassium tripolyphosphate (KTPP). When prepared, the viscosity of the aqueous composition is 300–12,000 cp (Brookfield Cone and Plate). When the composition is shipped, it is up to 35 percent water by weight with a viscosity of about 100–2000 cp. At application, the composition will be no more than 50 percent water by weight with a viscosity between 20–100 cp.

Optimally, the aqueous composition will contain an amine. The preferred amines are hydroxyl-containing amines. The volatile organic compound content (VOC content) of the aqueous composition will be less than 2, preferably less than 1.7.

Method 24 is a common method for determining VOC content. According to Method 24, the VOC content for single component coatings is determined by calculating the total volatile content in grams for the water and/or exempt material content in grams and dividing by the volume of the test specimen corrected for the water and/or exempt material volume. The VOC content is reported as the mass per unit volume of coating (grams per liter or pounds per gallon) or as the mass per unit volume of coating solids (grams per liter of solids).

For multi-component coatings, the VOC content is determined using the following equations:

$$VOC = \frac{(\text{total volatiles less water less exempt solvents})(\text{density of coating})}{100\% - (\text{volume percent of water}) - (\text{volume percent of exempt solvents})}$$

or $$VOC = \frac{(Wo)(Dc)}{100\% - Vw - Vex}$$

Where:
$W_o$ = weight percent of organic volatiles
$V_W$ = volume of water, %, $(W_w)(D_c/D_w)$
$V_{ex}$ = volume of exempt solvent, %, $(W_{ex})(D_c/D_{ex})$
$D_c$ = density of coating, g/L, at 25° C.

The VOC content for multi-component coatings is expressed as the mass of VOC per unit volume of the coating minus water and exempt solvents.

The diluent of the present invention can be an organic solvent. Suitable organic solvents include alcohols having up to about 8 carbon atoms, such as ethanol and isopropanol; and alkyl ethers of glycols, such as 1-methoxy-2-propanol, and monoalkyl ethers of ethylene glycol, diethylene glycol and propylene glycol. Preferably, the diluent includes a propylene glycol monomethyl ether or a dipropylene glycol monomethyl ether that are commercially available from Dow Chemical Company. A suitable propylene glycol monomethyl ether is available from Dow Chemical Company under the trademark DOWANOL PM. A suitable dipropylene glycol monomethyl ether is commercially available under the trademark DOWANOL DPM.

Other suitable organic solvents include ketones such as cyclohexanone (preferred), acetone, methyl ethyl ketone, methyl isobutyl ketone and isophorone; esters and ethers such as 2-ethoxyethyl acetate, propylene glycol methyl ether acetates such as PM ACETATE, which is commercially available from Dow Chemical Company; and aromatic solvents such as toluene, xylene, aromatic solvent blends derived from petroleum such as those available under the trademark SOLVESSO®.

When prepared, the viscosity of the organic solvent-containing composition is 300–12,000 cp (Brookfield Cone and Plate). When the composition is shipped, it is 20–40 percent organic solvent by weight with a viscosity of about 100–2000 cp. At application, the composition will be approximately 50 percent organic solvent by weight, the composition with a viscosity between 20–100 cp.

The solvent-based composition contains an amine for stability purposes. The preferred amines are alkyl substituted morpholine compounds such as N-methyl and N-ethyl morpholine.

Optimally, the curable coating composition of the invention can further comprise surfactants. Surfactants can be used to improve the wetting of the substrate. Generally, surfactants are present in an amount of less than about 2 weight percent on a basis of total weight of the coating composition. Suitable surfactants are commercially available from Air Products and Chemicals, Inc. under the trademark SURFYNOL 104 PA.

The coating composition of the present invention can also include corrosion resistant pigments. Suitable corrosion resistant pigments include, but are not limited to, zinc phosphate, calcium ion-exchanged silica, colloidal silica, synthetic amorphous silica, and molybdates such as calcium molybdate, zinc molybdate, barium molybdate, strontium molybdate, and mixtures thereof. Suitable calcium ion-exchanged silica is commercially available from W.R. Grace & Co. under the trademark SHIELDEX® AC3. Suitable colloidal silica is available from Nissan Chemical Industries, Ltd. under the trademark SNOWTEX. Suitable amorphous silica is available from W.R. Grace & Co. under the trademark SYLOID®.

The curable coating composition can further comprise other optional ingredients such as inorganic lubricants like molybdenum disulfide particles that are commercially available from Climax Molybdenum Marketing Corporation. The coating composition can also include extender pigments such as iron oxides and iron phosphides, flow control agents, and thixotropic agents such as silica, montmorillonite clay and hydrogenated castor oil. Further, the coating composition can include anti-settling agents such as aluminum stearate and polyethylene powder, dehydrating agents which inhibit gas formation such as silica, lime or sodium aluminum silicate, and wetting agents including salts of sulfated castor oil derivatives such as those commercially available from Cognis Corporation under the trademark RILANIT R4.

Preferably, the curable coating composition is essentially free of chromium-containing materials, i.e., contains less than about 2 weight percent of chromium-containing materials (expressed as $CrO_3$), and more preferably less than about 0.05 weight percent of chromium-containing materials, and most preferably about 0.00001 weight percent. Examples of such chromium-containing materials include chromic acid, chromium trioxide, chromic acid anhydride, dichromate salts such as ammonium dichromate, sodium dichromate, potassium dichromate, and calcium chromate.

In practice, the curable coating composition of the present invention will be applied on a metal substrate. Metal substrates used in the practice of the present invention include ferrous metals, non-ferrous metals and combinations thereof. Suitable ferrous metals include iron, steel, and alloys thereof. Nonlimiting examples of useful steel materials include cold rolled steel, galvanized (zinc coated) steel, electrogalvanized steel, stainless steel, pickled steel, zinc-iron alloy such as Galvanneal, Galvalume and Galfan zinc-aluminum alloys and combinations thereof. Useful non-ferrous metals include aluminum, zinc, magnesium and alloys thereof. Combinations or composites of ferrous and non-ferrous metals can also be used.

At application, the temperature of the coating composition is typically about 10° C. to about 85° C., and preferably about 15° C. to about 60° C. For aqueous coating compositions, the pH of the coating composition at application generally ranges from about 7.0 to about 12.0, and is preferably about 8.0 to about 10.5.

If the pH of the coating composition needs to be adjusted, water-soluble or water-dispersible acids and/or bases can be used. Suitable acids include mineral acids, such as hydrofluoric acid, fluoroboric acid, phosphoric acid, and nitric acid; organic acids, such as lactic acid, acetic acid, hydroxyacetic acid, citric acid, and mixtures thereof. Suitable bases include inorganic bases, such as sodium hydroxide and potassium hydroxide; nitrogen-containing compounds such as ammonia, triethylamine, methyl ethanol amine, diisopropanolamine; and mixtures thereof.

The curable coating composition of the invention can be applied to the surface of a metal substrate by any conventional application technique, such as spraying, immersion or roll coating in a batch or continuous process. Squeegee or wringer rolls can be used to remove excess coating. After application, the curable coating is cured to form a cured coating upon the metal substrate. Curing can be achieved at peak metal temperatures of 100–400° C. Peak metal temperatures of about 150° C. to about 300° C. are preferred. The cure times utilized in the present invention range from twenty (20) seconds to sixty (60) minutes.

The thickness of the applied coating is determined mainly by the application conditions. Generally, to achieve sufficient corrosion resistance for automotive use, the applied coating should have a film thickness of at least about 1 micrometer (about 0.04 mils), preferably about 1 to about 20 micrometers, and more preferably about 2 to about 10 micrometers. For other substrates and other applications, thinner or thicker coatings can be used.

One of the major advantages of the curable coating composition of the invention is that it can be applied either at a steel mill or a coil coating facility. When the coating composition is applied at a steel mill, the following steps are followed. First, the curable coating composition is applied directly to a metal sheet shortly after it is formed and at a temperature of 20 to 150° C. Second, the coating composition is dried using an IR oven. IR ovens generate the high peak metal temperatures in short periods of time (2 to 30 seconds).

When the coating composition is applied at a coil coating facility, the process is as follows. A metal sheet is unwound from a metal coil and passed through a cleaning station, a coating station, and a curing station in a substantially continuous manner. As the metal sheet passes through the coating station, the curable coating composition of the present invention is applied to the metal sheet. The coating composition is cured as the coated metal sheet passes through the curing station.

The present invention will now be illustrated by the following specific, non-limiting examples. All parts and percentages are by weight unless otherwise indicated.

EXAMPLES

The following Examples are included in the application to describe and highlight the present invention. Examples A–F show how the resin of the present invention is synthesized. Examples 1–5 illustrate specific formulations of the coating composition according to the present invention. The Examples include a section that describes the preparation and subsequent coating of substrates according to the present invention. The Examples also include a section that shows the performance of substrates coated with the coating composition according to the present invention in regards to adhesion and corrosion.

RESIN SYNTHESES

Example A

To a 4-neck 3-liter round-bottom flask fitted with a reflux-condenser, a mechanical stirrer and a nitrogen inlet, were charged at ambient temperature 36.9 grams (0.32 mole) of 85% phosphoric acid and 50 grams of DOWANOL PM. The mixture was heated with stirring to 99° C. while maintaining a nitrogen blanket. A solution comprising 554 grams (0.6 mole) of EPON® 1004F commercially available from Shell Chemical Company and 553 grams of DOWANOL PM was added to the flask from an addition funnel at 99–100° C. over 52 minutes. The reaction mixture was then held at 100° C. for 53 minutes at which time the epoxy equivalent weight was determined to be greater than 20,000. Next, 21.6 grams of deionized water were added and the reaction mixture was held at 100–104° C. for 123 minutes. The reaction mixture was then cooled to 82° C., and a vacuum was applied resulting in 253 grams of distillate removed. To the reaction mixture were then added 57 grams (0.64 moles) of dimethylethanol amine dissolved in 100 grams of deionized water over eight minutes at 82° C. After mixing well, 934.5 grams of deionized water (preheated to approximately 70° C.) were added to the reaction mixture at 72–57° C. over 30 minutes. The reaction mixture was then cooled and poured into a plastic container. The solids of the resin solution were determined to be 31.1%, and the acid number was determined to be 18.1.

Example B

To a 4-neck 5-liter round-bottom flask fitted with a reflux condenser, a mechanical-stirrer and a nitrogen inlet were charged at ambient temperature 1880 grams (5.0 moles) of EPON® 828, 684 grams (3.0 moles) of Bisphenol A and 2.6 grams of ethyltriphenylphosphonium iodide. The mixture was stirred and heated to 130° C. while maintaining a nitrogen blanket. The reaction mixture was allowed to exotherm and reached a maximum temperature of 173° C. The reaction mixture was then held for about one hour as the temperature was allowed to fall to 150° C. The reaction mixture was then cooled to 120° C. over 60 minutes. The reaction mixture was then diluted by the addition of 1100 grams of DOWANOL PM over 35 minutes. The reaction mixture was then cooled and poured into a metal container and designated "epoxy resin solution X".The solids of the resin solution were determined to be 70.9%, and the epoxy equivalent weight was determined to be 917 as measured by potentiometric titration.

Example C

To a 4-neck 5-liter round-bottom flask fitted with a reflux condenser, a mechanical stirrer and a nitrogen inlet were charged at ambient temperature 123.1 grams (1.067 moles) of 85% phosphoric acid and 200 grams of DOWANOL PM. The mixture was stirred and heated to 99° C. while maintaining a nitrogen blanket. A solution comprising 1834 grams (1.0 mole) of "epoxy resin solution X" and an additional 519.7 grams of DOWANOL PM were added to the flask from an addition funnel at 99° C. over 78 minutes. An additional 100 grams of DOWANOL PM were used as a rinse for the addition funnel. The rinse was added to the reaction mixture. The reaction mixture was then held at 99° C. for 59 minutes at which time the epoxy equivalent weight was determined to be greater than 20,000 as measured by potentiometric titration. The reaction mixture was then cooled and filled out into a plastic container. The solids of the resin solution were determined to be 55.6%, and the acid number was determined to be 40.1.

Example D

To a 4-neck 5-liter round-bottom flask fitted with a reflux condenser, a mechanical stirrer and a nitrogen inlet were charged at ambient temperature 1880 grams (5.0 moles) of EPON® 828, 684 grams (3.0 moles) of Bisphenol A and 2.6 grams of ethyltriphenylphosphonium iodide. The mixture was stirred and heated to 130° C. while maintaining a nitrogen blanket. The reaction mixture was allowed to exotherm and reached a maximum temperature of 172° C. The reaction mixture was then heated to 180° C. and held for about one hour at 180° C. The heat was turned off, and the reaction mixture was allowed to stand overnight while maintaining a nitrogen blanket. The next morning, heat was carefully applied to melt the resin and when the resin was partially melted, 1100 grams of DOWANOL PM were added. The reaction mixture was then heated with good mixing until all the resin was dissolved. The resin solution was cooled and filled out into a metal container and designated "epoxy resin solution Y".The solids of the resin solution were determined to be 69.8%, and the epoxy equivalent weight was determined to be 945.

Example E

To a 4-neck 5-liter round-bottom flask fitted with a reflux condenser, a mechanical stirrer and a nitrogen inlet, were charged at ambient temperature 47.5 grams (0.267 mole) of superphosphoric acid and 221.3 grams of DOWANOL PM. The mixture was heated with stirring to 89° C. while maintaining a nitrogen blanket. A solution comprising 945 grams (0.5 mole) of "epoxy resin solution Y" and an additional 154.2 grams of DOWANOL PM were added to the flask from an addition funnel at 89–90° C. over 54 minutes. An additional 50 grams of DOWANOL PM were used as a rinse for the addition funnel. The rinse was added to the reaction mixture. The reaction mixture was then held at 90° C. for about one hour at which time the heat was turned off and the resin solution allowed to stand overnight while maintaining a nitrogen blanket. The next morning the reaction mixture was heated to 89° C. and the epoxy equivalent weight was determined to be greater than 20,000. The reaction mixture was then cooled and filled out into a plastic container. The solids of the resin solution were determined to be 51.4%, and the acid number was determined to be 28.3.

Example F

To a 4-neck 3-liter round-bottom flask fitted with a reflux condenser, a mechanical stirrer and a nitrogen inlet were charged at ambient temperature 888 grams (0.5 mole) of EPON® 1004F and 832 grams of DOWANOL PM. The mixture was heated with stirring to 101° C. while maintaining a nitrogen blanket. A solution comprising 47.5 grams (0.267 mole) of superphosphoric acid and 47.5 grams of DOWANOL PM were added from an addition funnel at 101–106° C. over 11 minutes. An additional 20 grams of DOWANOL PM were used as a rinse for the addition funnel. The rinse was added to the reaction mixture. The reaction mixture was then held at 101° C. for 74 minutes at which time the epoxy equivalent weight was determined to be greater than 20,000. Then 36 grams of deionized water were added and the reaction mixture was held at 100–105° C. for 120 minutes. The reaction mixture was then cooled and filled out into a plastic container. The solids of the resin solution were determined to be 54.61% and the acid number was determined to be 28.0.

COATINGS FORMULATIONS

Example 1

At ambient temperature, a water-based low cure coating composition was made by first adding 36.23 grams of CYMEL® 303 available from Cytec Industries, Inc. to 202.03 grams of Example A. While stirring the mixture with a Cowles blade, each of the following components was added sequentially in one minute intervals: 292.42 grams of Ferrophos HRS-3095; 32.58 grams of Shieldex AC3; 0.91 grams of Surfynol 104PA; and 2.72 grams of Rheology Modifier QR-708. The resultant mixture was then stirred with a Cowles blade for 30 minutes. A mild heating occurred. The initial viscosity was about 8700 centipoise (RVT Brookfield Spindle 52; 5.0 rpm), and grind gauge measurement was 4.5 (Hegman).

Example 2

At ambient temperature, a solvent-based low cure coating composition was made by first adding 25.70 grams of CYMEL® 303 to 133.73 grams of Example C. While stirring the mixture with a Cowles blade, 156.02 grams of Ferrophos 3095 were added over one minute followed by the addition of 17.00 grams of Shieldex AC3 over one minute. The resultant mixture was then stirred with a Cowles blade for 30 minutes. A mild heating occurred. Upon completion of the stirring, 76.55 grams of 1-methoxy-2-propanol were added and the resultant mixture was stirred with a Cowles blade for 5 minutes. The initial viscosity was about 500 centipoise (RVT Brookfield Spindle 52; 50 rpm), and grind gauge measurement was 5.0 (Hegman).

Example 3

A curable coating composition was prepared by stirring 88.1 grams of 2132 Ferrophos and 7.8 grams of Shieldex AC3 in with 57.5 grams of EPON® 1002F phosphated with phosphoric acid (equivalent ratio of phosphoric acid to epoxy 1:1.6). After stirring with a Cowles blade for 30 minutes, 31.4 grams of Propylene Glycol Monomethyl Ether were added and mixing was continued. Then 11.0 grams of CYMEL 303, 3.6 grams of Phosphatized Epoxy (equivalent ratio of phosphoric acid to epoxy of 1.6:1), hereinafter "Phosphated Epoxy A" and 1.0 grams of N-Ethylmorpholine were added. Mixing was continued for another 5 minutes.

Example 4

A curable coating composition was prepared by stirring 43.8 grams of 2132 Ferrophos and 3.9 grams of Shieldex AC3 in with 27.2 grams of EPON® 1004F (phosphated with phosphoric acid, equivalent ratio of phosphoric acid to epoxy of 1.6:1). After stirring with a Cowles for 30 minutes, 15.0 grams of Propylene Glycol Monomethyl Ether were added. Then 7.5 grams of CYMEL 11158, 1.8 grams of Phosphatized Epoxy A, and 0.5 grams of N-ethylmorpholine were added and mixing was continued for 5 minutes.

Example 5

A curable coating composition was prepared by stirring 2.7 grams of N-ethylmorpholine in with 46.8 grams Phosphatized EPON® 1004F of Example 4. Next, 76.4 grams of 2132 Ferrophos and 6.7 grams of Shieldex AC3 were added via stirring. After stirring with a Cowles blade for 30 minutes, 27.4 grams of Propylene Glycol Monomethyl Ether-were added. Lastly, 12.7 grams of CYMEL 1158 were added and mixing was continued for 5 minutes.

Preparation and Coating of Substrates

Two-sided 60G Electrogalvanized Steel (EG) and Zn/Fe two-sided hot dipped Galvanneal Steel (GA) steel panels were obtained from USX Corporation. Each panel was 15.3 centimeters (cm) wide and 38.1 cm long. The steel panels were subjected to an alkaline cleaning process by spray in a 20% by volume bath of CHEMKLEEN 163 (CK163) which is available from PPG Industries, Inc. at a temperature of 60° C. (140° F.) for 60 seconds. Alternatively, the steel panels were subjected to an alkaline cleaning process by spray in a 0.85% by weight bath of Parco 338 (P338) which is available from Henkel, Inc. at a temperature of 65° C. (149° F.) for 10 seconds. The panels were removed from the alkaline cleaning bath, rinsed with room temperature deionized water (about 21° C. (70° F.)) for 5 seconds and dried with warm air (about 40° C.).

Some of the panels were pretreated with NUPAL® 456BZR. Panels coated with commercially available compositions were prepared with and without pretreatment. None of the panels coated with compositions according to the present invention was pretreated.

After cleaning (and possibly pretreatment in the case of panels coated with commercially available compositions), the panels were coated using wire drawbars and baked at 193° C. (380° F.) for 40 seconds until a peak metal temperature of 143° C. (290° F.) was achieved. The resulting drawbar type/corresponding dried film thickness values are reported in Table 1. The panels were then quenched with ambient temperature deionized water and dried prior to testing.

Adhesion and Corrosion Testing

To determine the adhesion of the coating systems under fabrication conditions, three tests were conducted. For the first two tests, panels coated as described above (without application of lubricant) were subjected to Erichsen adhesion and 160 inch-pound reverse impact tests. A second set of panels was coated with about 1064 mg/m$^2$ (about 100 mg/ft$^2$) of Quaker 61AUS mill oil and drawn into square cups 25.4 mm (1 inch) in height and 36.5 mm (1$^7$⁄$_{16}$ inches) along each side. Adhesion performance was evaluated on areas of the cups where deformation and strain were the greatest (sides and top/bottom corners).

After completion of all three fabrication tests, the panels were exposed to a phosphate process that would be typical of original equipment manufacture (OEMs). The phosphate process involves the following steps:

1) Spray Clean with CK490MX (2 oz/gal—567 g/10 gal) for 5 minutes at 120° F. and a pressure between 10–20 psi;
2) Perform an immersion rinse with warm tap water for approximately 20 seconds at 120° F.;
3) Apply an immersion rinse conditioner (1 g/L) for 1 minute at 100° F.;
4) Apply an immersion phosphate with CF700 for 2 minutes at 122° F.;
5) Perform an immersion rinse with deionized water for approximately 30 seconds at ambient temperature;
6) Perform an immersion seal comprising:
    a) For Europe, use CHEMSEAL™ 19 available from PPG Industries, Inc., adjusted with 10% NH$_4$OH until pH=4 to 4.5. Apply for approximately 1 minute at ambient temperature.
    b) For the United States, use CHEMSEAL 59 available from PPG Industries, Inc., CS59 (1% v/v, where % v/v stands for volume to volume, i.e., for every 100 mL of solution, there is 1 mL of CS59) adjusted with 10% NH$_4$OH until pH=4 to 4.5. Apply for approximately 1 minute at ambient temperature.
7) Perform a spray bottle final rinse with deionized water. Rinse each side three times for approximately 5 seconds at ambient 5 temperature;
8) Dry using warm air; and.
9) Bake at 350° F. for 60 minutes.

Tables 1 and 2

The percentage of area in which complete delamination occurred for each sample is shown in Tables 1 and 2 below. After the initial adhesion evaluation, cups were placed in corrosion testing (PPG STM-0772 based on GM TM-54-26 APG test) for 20 cycles. Relative ratings according to the percentage of red rust that formed over the entire tested surface of the cup, as well as the degree of white stain, are shown in Table 2. Data from standard high temperature bake controls (with and without pretreatment) are shown for comparison.

In Tables 1 and 2 below, NUPAL is a registered trademark of PPG Industries, Inc. for metal pretreatment compositions and is described in U.S. Pat. No. 5,858,282 entitled "Aqueous Amine Fluoride Neutralizing Composition for Metal Pretreatments Containing Organic Resin and Method". BZ is an abbreviation for BONAZINC™, a trademark of PPG Industries Ohio, Inc. for zinc-rich coating. MEK is an abbreviation for methyl ethyl ketone. "MEK rubs" is a test for solvent resistance which entails rubbing a cloth saturated with methyl ethyl ketone back and forth ("double rub") using normal hand pressure until the coating is marred. The phosphate test referred to in Table 1 is the ten-step process included in the "Adhesion and Corrosion Testing" section above.

TABLE 1

| SUBSTRATE TESTED (Cleaner type) {Pretreatment} if any | COATING (PMT Cure) 'Dry Film Thickness' | MEK Rubs | INITIAL ADHESION Erichsen[1] Adhesion % Coating Loss after Phosphate Process[3] | INITIAL ADHESION 160 lb Rev. Impact[2] % Coating Loss after Phosphate Process[3] | INITIAL ADHESION CUPS % Coating Loss after Phosphate Process[4] |
|---|---|---|---|---|---|
| USX EG (P338) (Nupal ® 456BZR) | BZ3000 (254° C.) '3–4 microns' | 100+ | <5% | <5% | 10% |
| USX EG (P338) (no pretreat) | BZ3000 (254° C.) '3–4 microns' | 20 | 95 to 100% | 95 to 100% | 70–80% |
| USX GA (P338) (Nupal ® 456BZR) | BZ3001 (232° C.) '3–4 microns' | 100+ | <5% | <5% | 5% |
| USX EG (P338) (no pretreat) | BZ3001 (232° C.) '3–4 microns' | 100+ | 95 to 100% | 95 to 100% | 60–70% |
| USX EG (CK163) (no pretreat) | Example 1 (140° C.) '4–5 microns' | 20–50 | <5% | <5% | <5% |
| USX GA (CK163) (no pretreat) | Example 1 (140° C.) '4–5 microns' | 100+ | <5% | <5% | 5% |
| USX EG (CK163) (no pretreat) | Example 2 (140° C.) '4–5 microns' | 100+ | <5% | <5% | 5% |
| USX GA (CK163) (no pretreat) | Example 2 (140° C.) '4–5 microns' | 100+ | <5% | <5% | 5% |
| USX EG (P338) (no pretreat) | Example 3 (140° C.) '3–4 microns' | 20–50 | 50–70% | 70–90% | 5% |
| USX EG (P338) (no pretreat) | Example 4 (140° C.) '3–4 microns' | 100+ | <5% | <5% | 5% |
| USX EG (P338) (no pretreat) | Example 5 (140° C.) '4–5 microns' | 100+ | <5% | <5% | 5% |

[1]Erichsen Adhesion Test: SOP-40-017 Operation of the Erichsen Sheet Metal Testing Machine. The panels are placed in the machine, unoiled and coated side out, and drawn to 8 mm. The bump is then taped with Scotch 610 tape and the percent of coating remaining on the bump is estimated.
[2]Reverse Impact Test: The panel is placed unoiled and coated side down in the Gardner Impact Tester with a 4 lb. weight. The weight is raised to and dropped from the height corresponding to a 160 in-lb. impact. The bump is then taped with Scotch 610 tape and the percent of coating remaining on the bump is estimated.
[3]Values based on the range over two bumps.
[4]Values based on the average of two cups.

TABLE 2

| SUBSTRATE TESTED (Cleaner type) {Pretreatment} if any | COATING (PMT Cure) 'Dry Film Thickness' | APG TESTING PANELS % RED RUST (Degree of White Stain)[1] | APG TESTING CUPS % RED RUST (Degree of White Stain)[1] |
|---|---|---|---|
| USX EG (P338) (Nupal ® 456BZR)[2] | BZ3000 (254° C.) '3–4 microns' | 10–30% (Moderate) | 80–90% (Moderate) |
| USX GA (P338) (Nupal ® 456BZR)[2] | BZ3001 (232° C.) '3–4 microns' | 5–20% (Moderate) | 20–30% (Moderate) |
| USX EG (CK163) (no pretreat) | Example 1 (140° C.) '4–5 microns' | 2–3% (light) | 30–40% (Moderate) |
| USX GA (CK163) (no pretreat) | Example 1 (140° C.) '4–5 microns' | <2% (light) | 20–30% (Moderate) |
| USX EG (CK163) (no pretreat) | Example 2 (140° C.) '4–5 microns' | 3–5% (light) | 30–40% (Moderate) |
| USX GA (CK163) (no pretreat) | Example 2 (140° C. ) '4–5 microns' | <2% (light) | 10–15% (light) |
| USX EG (P338) (no pretreat) | Example 3 (140° C.) '3–4 microns' | 5–30% (light to moderate) | 20–30% (moderate) |
| USX EG (P338) (no pretreat) | Example 4 (140° C.) '3–4 microns' | 5–20% (light to moderate) | 20–30% (moderate) |
| USX EG (P338) | Example 5 (140° C.) | 3–5% (light) | 25–35% (moderate) |

TABLE 2-continued

| SUBSTRATE TESTED (Cleaner type) {Pretreatment} if any | COATING (PMT Cure) 'Dry Film Thickness' | APG TESTING PANELS % RED RUST (Degree of White Stain)[1] | APG TESTING CUPS % RED RUST (Degree of White Stain)[1] |
|---|---|---|---|
| (no pretreat) USX EG (P338) (no pretreat) | '4–5 microns' Example 5 (140° C.) '4–5 microns' | <2% (light) | 5–15% (light) |

[1]Values based on the average of two or more test pieces.
[2]Due to the high level of coating delamination upon alkaline cleaning of unpretreated BZ3000 & BZ3001 controls (see Table 1), these variables were found to yield >80% red rust in <5 cycles of APG testing.

The data reported in Tables 1 and 2 above show that the coating compositions compare very favorably with commercially available zinc-rich coatings. The panels coated with compositions according to the present invention demonstrated excellent adhesion and corrosion resistance properties without metal pretreatment. In contrast to the results obtained using the composition of the present invention, panels coated with commercially available coatings did not demonstrate satisfactory adhesion and corrosion resistance without metal pretreatment. In addition to the demonstrated excellent adhesion and corrosion resistance properties, the compositions of the present invention can be cured at lower temperatures than commercially available coatings.

Weldability Test

The coating compositions of the present invention were tested for spot, weldability by coating two steel sheets on both sides with compositions of the present invention. Each sheet was approximately 2½ inches by 12 inches by 0.030 inches. The sheets were welded together repeatedly—each weld being spaced between ⅜ inches and ½ inches apart. After about 50 welds, the welded sheets were allowed to cool to prevent the sheets from becoming excessively hot. After cooling, another 50 welds were administered to the sheet. Testing Methods A and B, used to evaluate the coatings of this invention, involve approximately 1000 welds and measure welding parameters $A_{min}$, the welding current needed to form a "minimum nugget" and $A_{max}$, the highest current that can be used without violently ejecting molten metal from the weld ("expulsion").

Table 3 below summarizes the results of weldability testing. In Table 3, "lobe width" refers to the difference between $A_{min}$ and $A_{max}$. The "current stepping required" refers to the degree of current stepping required to maintain a certain safety margin which is defined as the excess current used beyond that needed to form a minimum nugget during the test. The parameters used to generate the welding data are as follows: Weld force=470 pounds; Squeeze time=45 cycles=45/60 sec; Weld time=9 cycles=9/60 sec; Hold time=5 cycles=5/60 sec; Off time=40 cycles=40/60 sec; Rate of Welding=36 welds per minute; and $A_{min}$=3.6 mm diameter.

TABLE 3[1]

| Example | Coating thickness, microns | Steel type[2] | Test method | Lobe width after 50 welds | lobe width after 500 welds | lobe width after 950 welds | Current stepping required | Comment |
|---|---|---|---|---|---|---|---|---|
| 1 | 3.4 | GA | A[3] | 1.2 kA | 1.5 kA | 1.0 kA | 0.8 kA | $A_{min}$ 7.2 to 8.0 |
| 2 | 3.8 | EG | A | 1.1 kA | 1.1 kA | 1.1 kA | 0.2 kA | $A_{min}$ 7.2 to 7.4 |
| 2 | 8.1 | GA | A | 1.5 kA | 1.2 kA | 0.7 kA | 1.1 kA | $A_{min}$ 6.8 to 7.9 |
| 5 | 4.0 | EG | B | 1.9 kA | 1.7 kA | 1.1 kA | 0.5 kA | $A_{max}$ 8.8 to 9.3 |
| 5 | 6.8 | GA | B[4] | 1.4 kA | 1.2 kA | 0.9 kA | 0.1 kA | $A_{max}$ 8.5 to 8.6 |
| Bonazinc 3000 | 3.7 | EG | A | 1.9 kA | 1.2 kA | 1.3 kA | 1.4 kA | $A_{min}$ 6.9 to 8.3 |
| Bonazinc 3001 | 3.7 | EG | A | 1.2 kA | 0.9 kA | 1.6 kA | 1.4 kA | $A_{min}$ 6.4 to 7.8 |

[1]The welding data included in Table 3 was evaluated using a model 150 AP resistance spot welder from Lors Corporation of Union, New Jersey, equipped with a Model 108B welding controller from Interlock Industries, Inc, and Lors Corporation. The welding current in kiloamperes (kA) was measured using a model MM-315A Weld Checker from Unitek Miyachi Corporation of Monrovia, California. MB 25Z copper welding tips from the Wheaton Company, Inc. of Warminster, Pennsylvania with a starting face diameter of 3/16 inch were used.
[2]EG = Electrogalvanized Steel; and GA = Galvanneal.
[3]In Method A, $A_{min}$ was measured every 200 welds and subsequent wear welds were measured at 1.0 kA increments over the new $A_{min}$.
[4]In Method B, $A_{max}$ was determined every 200 welds with the welding current being adjusted to the new $A_{max}$ for the following set of wear welds.

All welds were successful using Examples 1, 2 and 5 since the high amperage welding current passed through the sheets. There were no cases in which the welding tips became fouled to the extent that current flow was prevented. Because (1) the amount of current stepping required to maintain a welding safety margin over 1000 welds is smaller than commercially used controls and (2) it is no larger than some examples utilized in commercial automobile assembly, all of the examples are judged to be weldable for the purposes of repetitive automotive spot welding.

What is claimed is:

1. An aqueous-based curable coating composition comprising:
   a. a resinous binder comprising
      i. a reaction product of an epoxy-containing polymer with a compound containing phosphorus acid groups, the reaction product having reactive functional groups, ii. a curing agent having functional groups reactive with the functional groups of (i);

b. an electroconductive pigment dispersed in (a) such that the weight ratio of b to (i) plus (ii) is within the range of 0.5 to 9.0:1; and c. water, the coating composition being characterized such that when it is deposited and cured on a metal substrate, the cured coating is weldable.

2. The coating composition according to claim 1 further comprising stabilizers, dispersants, and thickeners.

3. The coating composition according to claim 2 wherein the stabilizer/dispersant is potassium tripolyphosphate.

4. The coating composition according to claim 1 further comprising an amine.

5. The coating composition according to claim 1 further comprising corrosion inhibiting pigments.

* * * * *